(12) United States Patent
Sonntag et al.

(10) Patent No.: US 9,143,373 B2
(45) Date of Patent: Sep. 22, 2015

(54) TRANSPORT OF AN ANALOG SIGNAL ACROSS AN ISOLATION BARRIER

(71) Applicant: Silicon Laboratories Inc., Austin, TX (US)

(72) Inventors: Jeffrey L. Sonntag, Austin, TX (US); Douglas R. Frey, Bethlehem, PA (US); Michael J. Mills, Austin, TX (US); András Vince Horvath, Budapest (HU); Anantha Nag Nemmani, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/266,153

(22) Filed: Apr. 30, 2014

(65) Prior Publication Data

US 2015/0063434 A1    Mar. 5, 2015

Related U.S. Application Data

(60) Provisional application No. 61/872,537, filed on Aug. 30, 2013.

(51) Int. Cl.
*H04B 1/38*    (2015.01)
*H04L 5/16*    (2006.01)
*H04L 27/156*    (2006.01)
*H04L 25/02*    (2006.01)

(52) U.S. Cl.
CPC ........ *H04L 27/1563* (2013.01); *H04L 25/0266* (2013.01)

(58) Field of Classification Search
CPC . H04L 27/1563; H04L 25/0266; H04L 7/033; H04M 11/06
USPC ........ 375/238, 220, 295, 316, 222, 257, 258; 330/10; 327/168; 332/109; 329/312
See application file for complete search history.

(56) References Cited

U.S. PATENT DOCUMENTS

| | | | |
|---|---|---|---|
| 7,095,981 B1 * | 8/2006 | Voroba et al. | 455/41.2 |
| 2002/0196642 A1 | 12/2002 | Goder et al. | |
| 2003/0030486 A1 * | 2/2003 | Noro et al. | 330/10 |
| 2008/0159360 A1 * | 7/2008 | Florence et al. | 375/211 |

* cited by examiner

*Primary Examiner* — Phuong Phu
(74) *Attorney, Agent, or Firm* — Abel Law Group, LLP

(57) ABSTRACT

An analog signal is transported across an isolation channel using edge modulation/demodulation of a pulse width modulated (PWM) signal. An edge modulator is responsive to rising edges of the PWM signal to generate first pulses having a first predetermined pulse width and is responsive to receipt of falling edges of the PWM signal to generate second pulses having a second predetermined pulse width with the same polarity as the first pulses. On the opposite side of the isolation channel an edge demodulating circuit recreates the PWM signal using the first and second pulses. The rise and falling edges of the PWM signals can be distinguished based on the pulse width of the first and second pulses. A second order pulse width modulator may be used to generate the PWM signal.

20 Claims, 6 Drawing Sheets

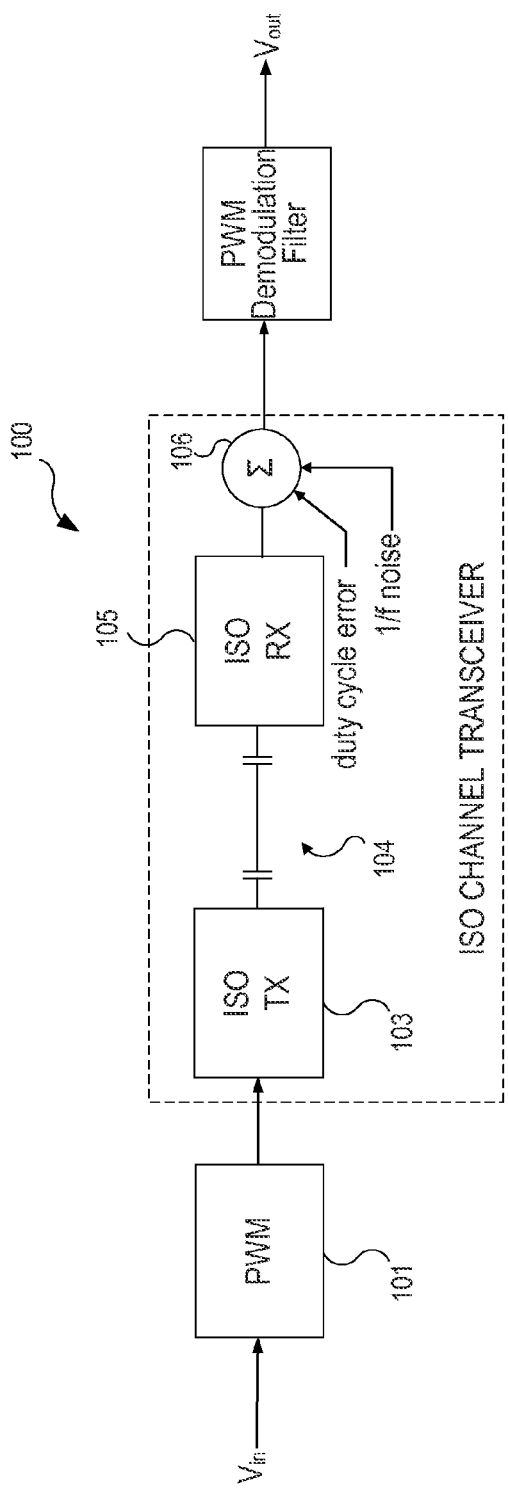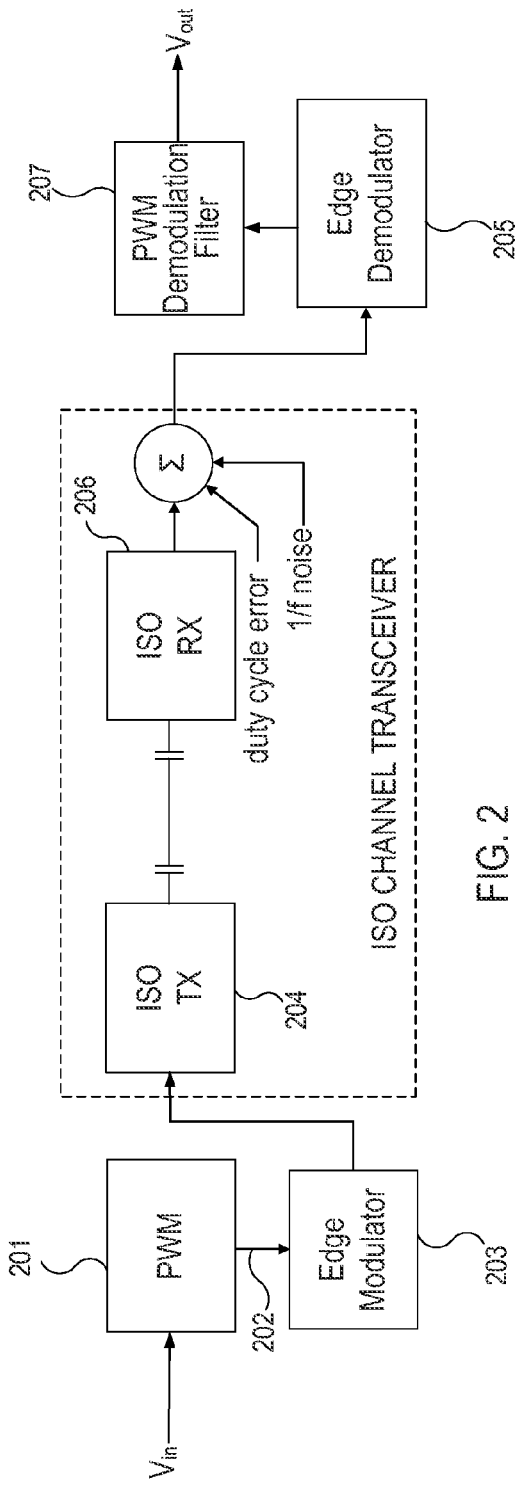

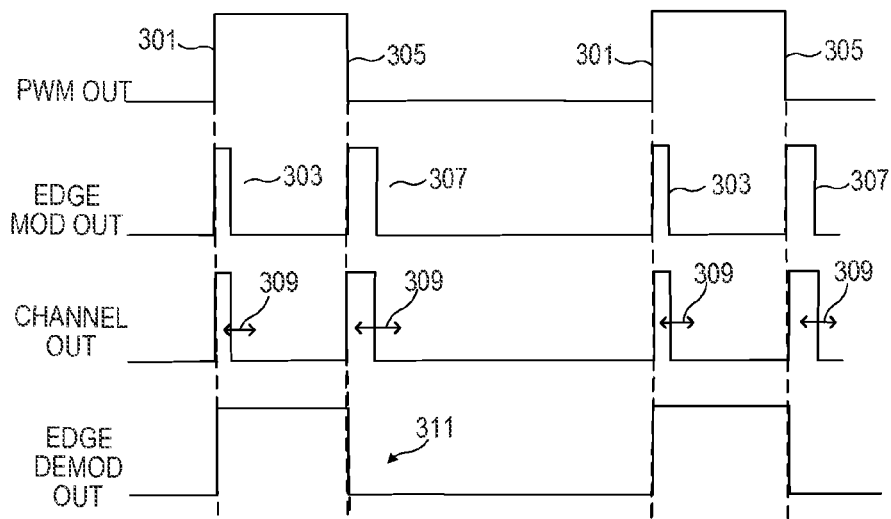
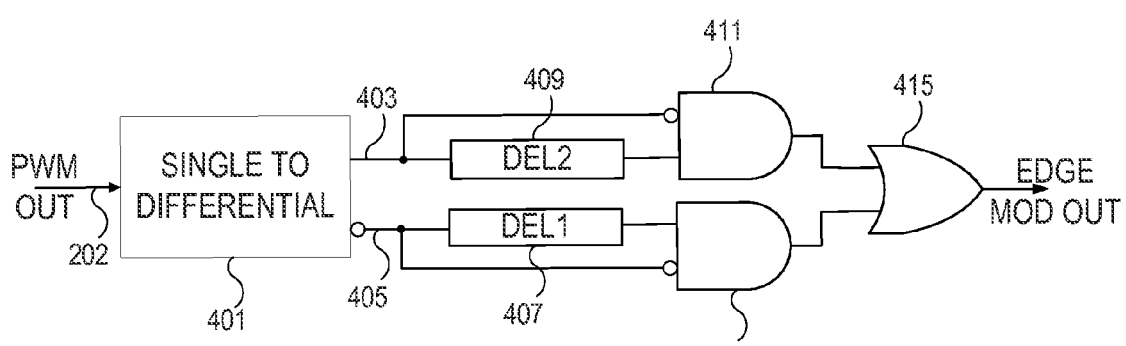
FIG. 4

TRANSPORT OF AN ANALOG SIGNAL ACROSS AN ISOLATION BARRIER

CROSS REFERENCE TO RELATED APPLICATIONS

This application claims benefit of provisional application 61/872,537, filed Aug. 30, 2013, entitled "Transport of an Analog Signal Across An Isolation Barrier", which application is incorporated herein by reference.

BACKGROUND

1. Field of the Invention

This invention relates to isolation barriers and more particularly to communication across isolation barriers.

2. Description of the Related Art

Isolation barrier refers to an electrical isolation between two domains. Such isolation may be needed because during normal operation a large DC or transient voltage difference exists between the domains. For example, one domain may be "grounded" at a voltage which is switching with respect to earth ground by hundreds or thousands of volts. Another reason for such isolation is based on safety, even when the expected voltage difference between the domains is small in normal operation. An example of this would be in biomedical applications, where electrodes are taped to a patient's body; safety concerns demand an extra layer of protection between the patient and the ground of the measurement device, despite the fact that the measurement device is supposed to be properly grounded.

Isolation barriers typically consist of layers of dielectrics with good breakdown properties. Communication across isolation barriers is commonly done using optical (opto-isolators) or inductive (transformer) solutions. Capacitive isolation circuitry may also be used to transmit digital information across isolation barriers.

Various applications demand the transfer of analog information across an isolation barrier. Generally it is always possible to convert analog signals to digital on one side of the barrier, and transmit digital signals instead of analog signals directly. However, such an approach has additional component cost, additional power, and signal impairments caused by the conversion.

Thus, improvements in transmitting analog signals across isolation barriers would be desirable.

SUMMARY OF EMBODIMENTS OF THE INVENTION

In an embodiment a method includes receiving a pulse width modulated (PWM) signal, converting a rising edge of the pulse width modulated signal to a first pulse having a first width, converting a falling edge of the pulse width modulated signal to a second pulse having a second width; and transmitting the first and second pulses across a communication channel.

In an embodiment an apparatus includes an edge modulation circuit coupled to receive a pulse width modulated (PWM) signal and supply an edge modulated PWM signal. The edge modulation circuit is responsive to receipt of a rising edge of the pulse width modulated signal to generate a first pulse having a first pulse width. The edge modulation circuit is responsive to receipt of a falling edge of the pulse width modulated signal to generate a second pulse having a second pulse width, the second pulse having the same polarity as the first pulse. The first and second pulses forming the edge modulated PWM signal. A transmitter is coupled to the edge modulation circuit to transmit the edge modulated PWM signal including the first and second pulses across a communication channel.

In an embodiment an apparatus includes an edge modulation circuit coupled to receive a pulse width modulated (PWM) signal. The edge modulation circuit is responsive to receipt of rising edges of the PWM signal to generate respective first pulses having a first pulse width and the edge modulation circuit is responsive to receipt of falling edges of the PWM signal to generate respective second pulses having a second pulse width, the edge modulation circuit thereby generating an edge modulated signal with first and second edges. A capacitive isolation channel is coupled to receive the edge modulated signal with the first and second edges. An edge demodulating circuit is coupled to receive the edge modulated signal from the capacitive isolation channel and recreates the PWM signal based on the first and second pulses.

BRIEF DESCRIPTION OF THE DRAWINGS

The present invention may be better understood, and its numerous objects, features, and advantages made apparent to those skilled in the art by referencing the accompanying drawings.

FIG. 1 illustrates a pulse width modulation system.

FIG. 2 illustrates a pulse width modulation system according to an embodiment of the invention including edge modulation and demodulation.

FIG. 3 illustrates a timing diagram associated with the system of FIG. 2.

FIG. 4 illustrates an edge modulator according to an embodiment.

The use of the same reference symbols in different drawings indicates similar or identical items.

DETAILED DESCRIPTION

Figure 5:
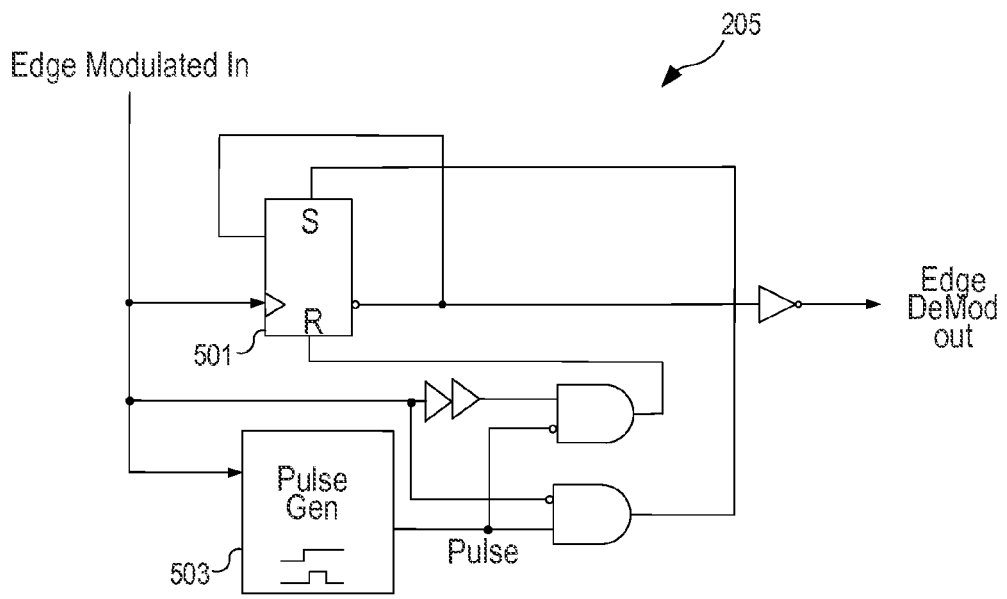
FIG. 5 illustrates an embodiment of an edge demodulator.

Analog transport of signals across isolation barriers can be particularly advantageous where applications have a need for low latency. For example, in current sensing applications (e.g., in motor control and switching power systems), latency can cause problems because current spikes (which can arise due to shorting or due to saturation of a magnetic component) should be sensed very quickly in order to prevent damage to the power transistors. In switching power supplies, sensing the (secondary) output voltage and reporting to the controller (which may be on the primary side) demands low latency because latency directly limits the achievable bandwidth of the control loop. If the load changes rapidly, the controller needs to react quickly in order to limit the resulting droop.

An existing analog transport solution utilizes analog opto-isolators. Analog opto-isolators generally have low latency, but relatively poor accuracy (e.g., gain error, offset error, distortion). Some opto-isolator implementations have a local photo-detector, which allows the creation of a local feedback loop which can do some correction. Another analog transport solution is based on an analog to digital converter (ADC). ADC based solutions generally use a sigma delta ADC on one side of the barrier, using a clock transported across the barrier, or a locally generated clock. On the other side of the barrier, the sigma delta bit stream may be converted back to an analog signal, or may be provided as a digital signal to the next stage of signal processing.

While there is little delay in sigma delta ADC conversion, the subsequent operations (decimation (conversion from single bit stream at high speed to a multi-bit signal at low speeds) or analog filtering of the bit stream (to create an analog output signal)) have substantial latency which depends quite strongly on the desired signal to noise ratio (SNR) of the final output. In a typical system with a second order sigma delta ADC, latency is approximately 150 µs, decimated signal bandwidth is only 10 KHz, and doubling the bandwidth (reducing the latency by two times) results in a 15 dB decrease in SNR.

In order to provide a low latency solution to analog transport across an isolation barrier, an embodiment utilizes pulse width modulation (PWM). FIG. 1 illustrates a PWM system 100. An input voltage Vin is pulse width modulated in PWM block 101. The PWM signal is supplied to the isolation channel. The isolation transmitter 103 transmits the PWM signal across the capacitive isolation channel 104 to the isolation receiver 105. Passing the PWM signal through an imperfect digital channel such as the isolation channel changes the transition times of the signal due to pulse width distortion and 1/f noise in the channel. Those changes can produce a duty cycle error in the PWM signal, which is delivered on the output side. The effect of these changed transition times (once filtered by the PWM demodulator) work out the same as if there was an offset and/or 1/f noise in the analog channel. FIG. 1 illustrates such error sources by showing duty cycle error and 1/f noise being summed with the received PWM signal in summer 106. Such impairments present in the PWM signal are also present in the demodulated PWM signal.

Accordingly, an embodiment utilizes edge modulation that converts every PWM edge to a pulse. All of the generated pulses are of the same polarity as the pulses pass through the isolation channel. Subsequent demodulation of the edge modulation and PWM demodulation result in a signal that is not impaired by isolation channel pulse width distortion or additive low frequency noise. Referring to FIG. 2, the edge modulator 203 is inserted after the PWM 201. The edge demodulator 205 is inserted before the PWM demodulation filter 207. The edge modulator supplies the transmitter 204 that transmits the edge modulated signal across the isolation barrier to receiver 206.

FIG. 3 illustrates a timing diagram associated with operation of the edge modulator 203 and the edge demodulator 205. Referring to FIG. 3, the edge modulator 203 converts rising edges 301 of the PWM signal to a pulse 303 of a first preselected width. The edge modulator 203 converts falling edges 305 of the PWM signal to a pulse 307 of the same polarity but a second preselected width different from the first width. In the embodiment shown in FIG. 3 the pulses are positive going pulses and the first pulse is narrower than the second pulse. Other embodiments may choose different polarities and different widths. The different widths associated with the rising and falling edges allow the pulses associated with each edge to be distinguishable on the receiving side. As shown in FIG. 3, the pulses received at the output of the channel may have pulse width distortion resulting in pulses being longer or shorter as indicated by the errors 309. The edge demodulator 205 (FIG. 2) demodulates the received pulses into a pulse width modulation signal 311, which is supplied to the pulse width modulator filter 207 (FIG. 2). In an embodiment the edge demodulator 205 uses a toggle flip flop to convert the starting time of each pulse into a rising or falling edge, depending on whether the pulse was of the first or second preselected width. Note that circuit delays and channel delays are not shown in FIG. 3 for ease of illustration.

An analysis of the edge modulation/demodulation approach described herein shows several advantages associated with the approach. Because the demodulation process produces an output pulse width that depends on the difference of two rising edge channel delays, static pulse width distortion has no effect on the output signal's average value. Additionally, the demodulation can be considered a filtering operation on delay errors introduced in the channel, where:, $H(s)=1-e^{-sD/F_{mod}}$, where D is the duty cycle error, which has a magnitude response $$|H(s)|^2_{s=j2\pi f} = 2\left(1 - \cos\left(\frac{2\pi fD}{F_{mod}}\right)\right) \approx \left(\frac{2\pi fD}{F_{mod}}\right)^2,$$

which is very small for low frequencies which would pass through the PWM demodulation filter. Thus, it can be seen that certain kinds of channel impairments (both fixed duty cycle errors and slowly changing delay such as can be caused by flicker (1/f) noise) are removed or severely attenuated.

FIG. 4 illustrates a block diagram of an embodiment of edge modulation scheme. The PWM OUT signal 202 is provided to single to differential block 401 that provides both a normal representation of the signal 403 and inverted representation of the input signal 405. The delay block 407 (DEL1) generates in conjunction with AND gates 411, 413, and OR gate 415 a positive going pulse on a rising edge transition with a first preselected pulse width determined by the length of the delay DEL1. The delay block 409 (DEL2) generates in conjunction with AND gates 411, 413, and OR gate 415 a positive going pulse on a falling edge transition with a second preselected width determined by the length of the delay DEL2. Care may be taken to ensure that the starting time for pulses of both widths is closely matched—within a small fraction of a gate delay. While one possible edge modulation scheme is shown in FIG. 4, other edge modulation schemes may also be utilized in various embodiments of the invention.

Figure 6:
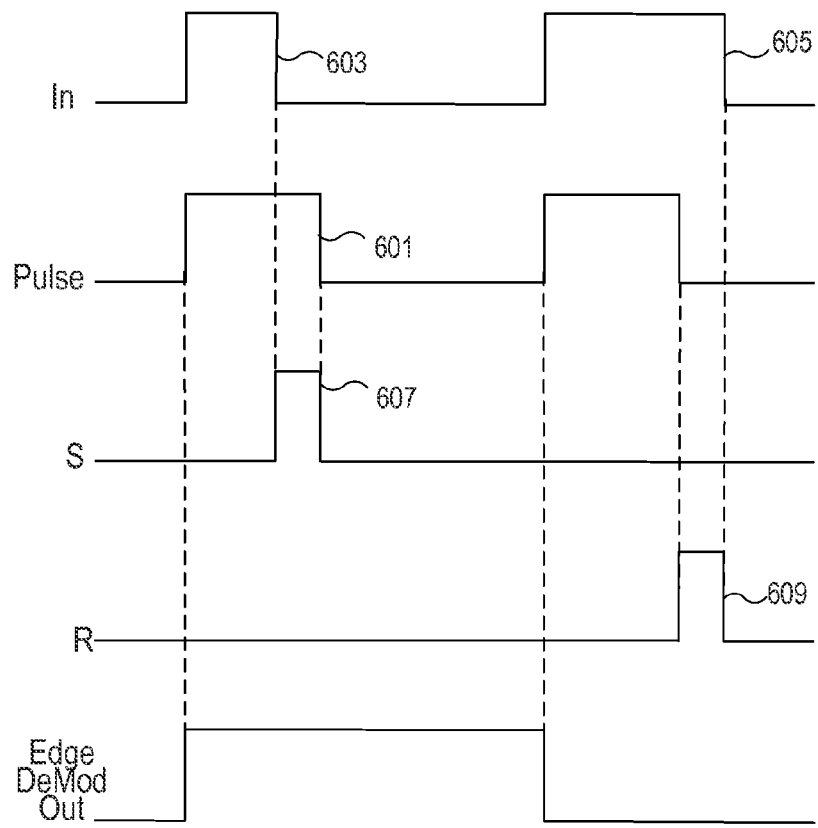
FIG. 6 illustrates a timing diagram associated with the edge demodulator.

The edge modulated signal is transported across the isolation channel. FIGS. 5 and 6 illustrate an exemplary edge demodulation approach. FIG. 5 illustrates a circuit diagram of an embodiment of an edge demodulator 205 and FIG. 6 illustrates a timing diagram associated with the circuit of FIG. 5. Demodulation starts with a toggle type flip-flop 501, causing an output transition based on the first edge of each pulse. That alone would produce the correct output, or the complement of the correct output, depending on initial conditions. The asynchronous Set (S) and Reset (R) inputs to the flip-flop force the flip-flop into the correct state. Note that except during initial startup, when a Set or Reset input is asserted, the flip-flop is already in the desired state. Pulse generation logic 503 generates a pulse 601 that has a width between the first preselected pulse width 603 and the second preselected pulse width 605. If the flip-flop is not in the right state the set pulse 607 will set the flip-flop or the reset pulse 609 will reset the flip-flop. Those set and reset pulses have no effect on the flip-flop output if the flip-flop is already in the right state.

Figure 7:
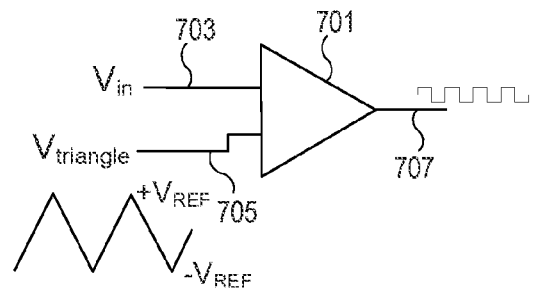
FIG. 7 illustrates a $0^{th}$ order pulse width modulation embodiment.

In order to implement edge modulation for a PWM signal, the PWM first signal has to be generated. FIG. 7 illustrates a $0^{th}$ order pulse modulation implementation. The comparator 701 compares the voltage signal Vin 703 with a triangle wave 705 and generates a pulse width modulated signal 707 based on the comparison. Typically the frequency of signal Vin is much slower (e.g., one or several orders of magnitude) than the frequency of modulation signal $V_{triangle}$. While the $0^{th}$ order modulation approach works well in principle, in the open loop system of FIG. 7 any signal level or slope dependence in delay of the comparator 701 results in uncompensated impairment. Additionally, the triangle wave generator also needs to be close to perfect. The PWM gain depends on the slope of the triangle, and peak voltages and slew rates can be quite difficult to control making the triangle wave generator a source for impairment in the uncompensated $0^{th}$ order modulation.

Figure 8:
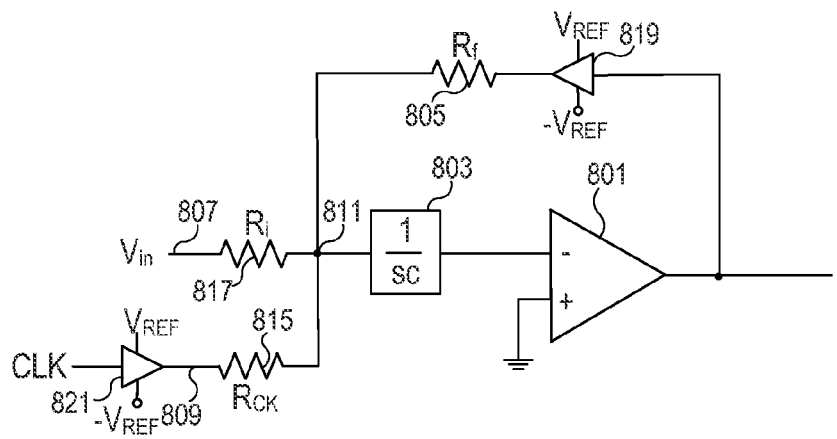
FIG. 8 illustrates a first order pulse width modulation embodiment.

Thus, rather than use the $0^{th}$ order PWM generator of FIG. 7, another embodiment utilizes a first order PWM generator as shown in FIG. 8. The first order system of FIG. 8 includes a comparator 801, an integrator 803 and feedback through feedback resistor $R_f$ 805. The input signal Vin 807 and the clock signal 809 are combined with the feedback signal at node 811. The plus input of comparator 801 is always at ground to address common mode dependent delay. In contrast to the open loop of the $0^{th}$ order system, the first order system has feedback so that sources of error due to, e.g., comparator delays dependent on whether the signal is high or low, or different rising and falling edge delays, can be corrected. The output of the comparator on average represents the input signal Vin. Any differences will be integrated in the integrator 803. Thus, the output of the comparator is fed back so that errors in the PWM signal are supplied to the integrator to cause a shift in the voltage supplied to the comparator from the integrator to adjust the pulse width of the PWM signal based on the error. The conversion gain of the first order system of FIG. 8 is independent of clock duty cycle and the value of the $R_{CK}$ resistance 815. Conversion gain (duty cycle of output per volt of input) depends only on the resistance $R_f$ 817 associated with the input voltage signal, the feedback voltage $R_f$ 805, and $V_{REF}$. As indicated by block 819, the feedback signal switches between $V_{REF}$ and $-V_{REF}$ volts. Similarly, block 821 shows that the input clock signal switches between $V_{REF}$ and $-V_{REF}$ volts. While the first order system is an improvement over the $0^{th}$ order system of FIG. 7, there are still drawbacks to the first order system. One constraint is that the conductance of $R_{CK}$ must be greater than the combined conductance of other resistances $$\left(\frac{1}{R_{CK}} > \frac{1}{R_i} + \frac{1}{R_f}\right).$$

The resistance $R_{CK}$ therefore dominates thermal noise generation. $R_{CK}$ also dominates integrator requirements, and disturbs the virtual ground at the integrator input, causing low level distortion.

Figure 9:
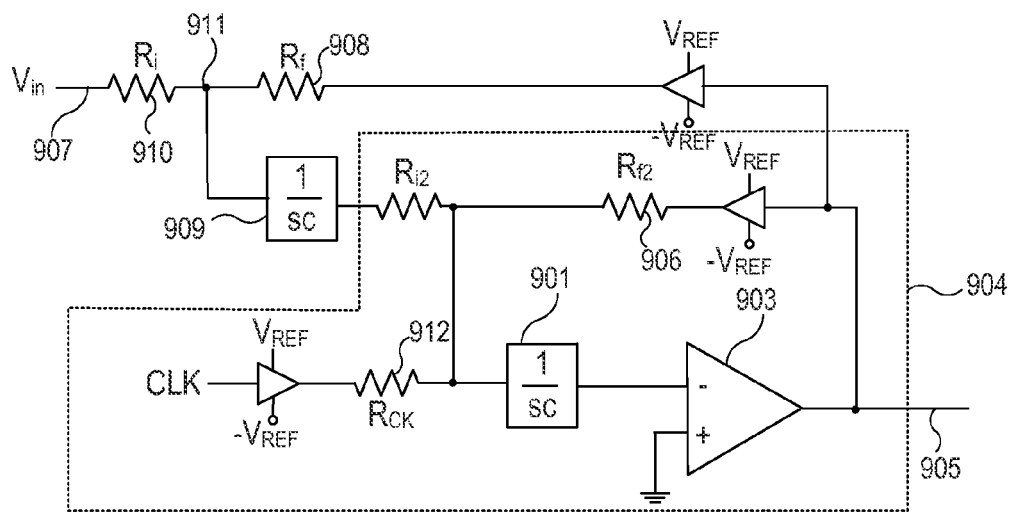
FIG. 9 illustrates a second order pulse width modulation embodiment.

FIG. 9 illustrates an exemplary second order pulse width modulation system that overcomes limitations of the first order PWM system. The second order system of FIG. 9 includes a second integrator 901 and a comparator 903 that form essentially a first order PWM 904 that modulates the error between the PWM output signal 905 and the input signal Vin 907. The first order PWM 904 includes an inner feedback loop through $R_{f2}$ 906 and integrator 901. The integrator 901 integrates the summing node formed by input resistance $R_{i2}$, feedback resistance $R_{f2}$ and $R_{CK}$. An outer feedback look is formed through $R_f$ 908 and integrator 909. The output of the comparator 903 reflects the average value of the input signal Vin. If there is an exact match, the current through the feedback resistor $R_f$ 908 and the current through input resistance $R_i$ 910 should match. To the extent the currents do not match, the error is integrated in integrator 909. In the first order system of FIG. 8, noise current power is proportional to 1/R. In the first order system of FIG. 8, the constraint on $R_{CK}$ 815 results in $R_{CK}$ dominating as a noise source. In contrast, in the second order system of FIG. 9, the key summing node 911 of input resistance $R_i$ 910 and feedback resistance $R_f$ 908 is independent of $R_{CK}$ 912. Noise and distortion are mostly independent of what happens after the first integrator 909. Noise from resistor $R_{CK}$ 912 is ultimately cancelled by the outer feedback loop. The second integrator 901 can now be impedance scaled (higher resistance, lower capacitance, and lower power operational amplifier) without adding noise, distortion, or gain error. The first integrator 909 is not disturbed by current steps through the resistance $R_{CK}$ 912 as the modulating signal CLK switches between $-V_{REF}$ and $V_{REF}$. Overall the signal to noise ratio (SNR) and signal to noise plus distortion ratio (SNDR) can be expected to improve substantially (e.g., approximately three fold for SNR) over what could be obtained with a first order system. SNDR improvement depends on details of amplifiers used. The improvement allows higher linearity and gain accuracy for a given technology limit in the performance of the first integrator 909.

Figure 10:
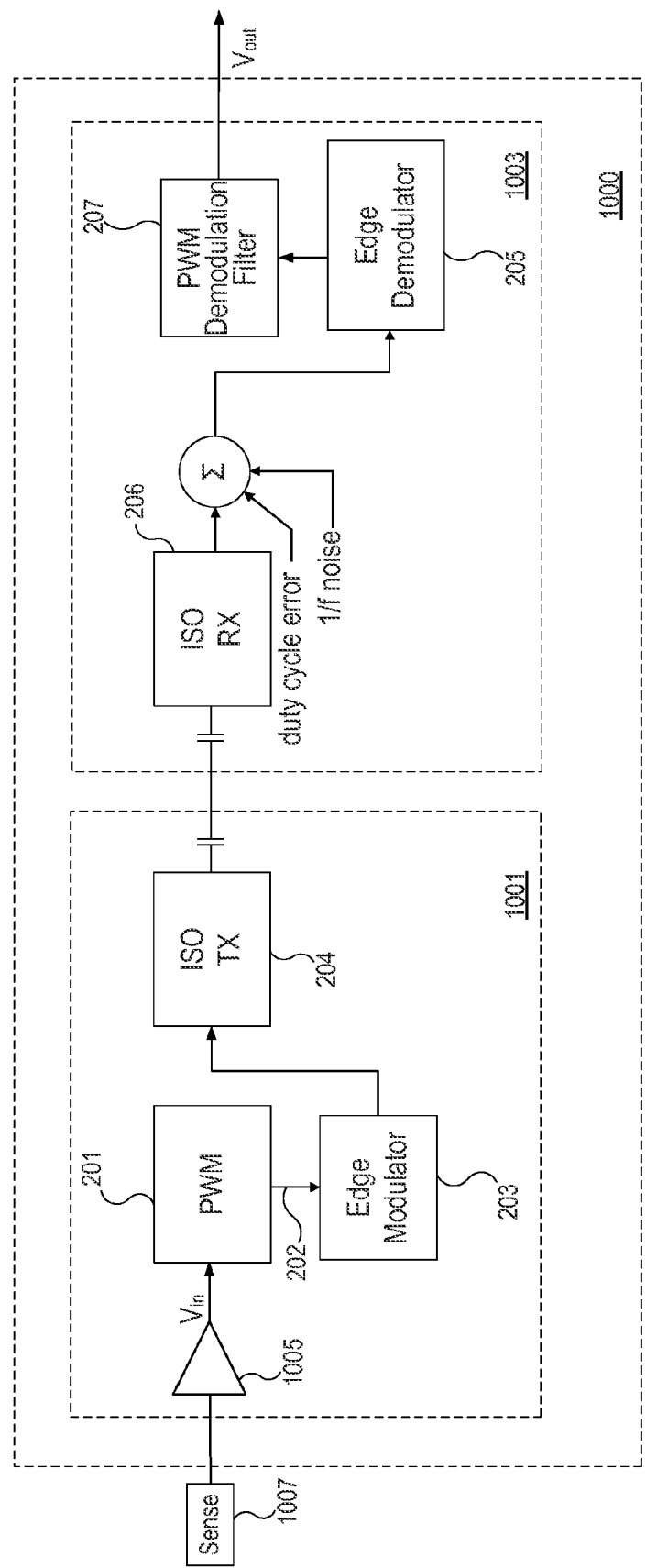
FIG. 10 illustrates an embodiment with a first and second die in a single package.

Thus, transport of the analog signal using the embodiments described herein may be useful in current sensing applications, e.g., in motor control and switching power systems. Thus, input voltage Vin 907 of FIG. 9 may be a voltage corresponding to a sensed current. FIG. 10 illustrates PWM system in a packaged integrated circuit 1000 including a first die 1001 having the transmit circuitry of the isolation system and a second die 1003 having receive circuitry of the isolation system. In an embodiment a low noise amplifier (LNA) 1005 allows a low level signal to be amplified and supplied as Vin. While shown as single-ended for ease of illustration, in an embodiment, the LNA 1005 is a fully differential chopped operational amplifier with very high open loop gain and different gain options to fit the input signal level for different applications. The low signal level may represent a sensed current or other sensed parameter from sense circuit 1007. While embodiments may utilize LNA 1005, other embodiments may provide the sensed parameter as Vin without a low noise amplifier.

Figure 11:
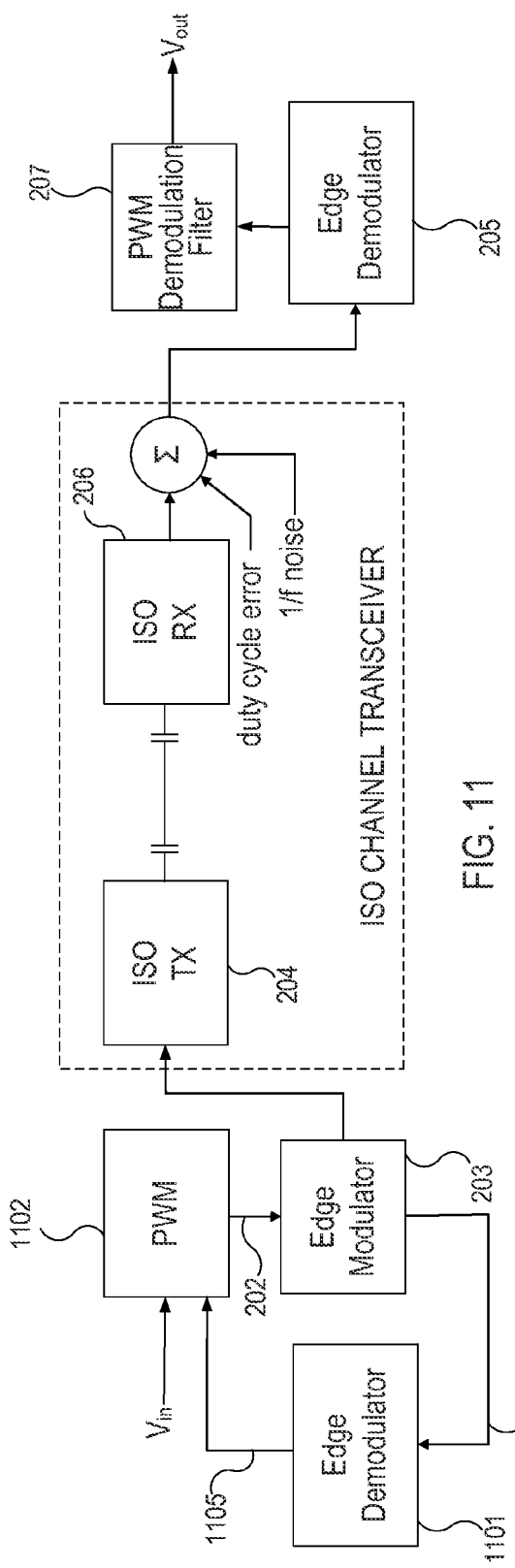
FIG. 11 illustrates an embodiment in which impairments caused by the edge modulator are addressed by utilizing an edge demodulator to generate a feedback signal for the PWM.
Figure 12:
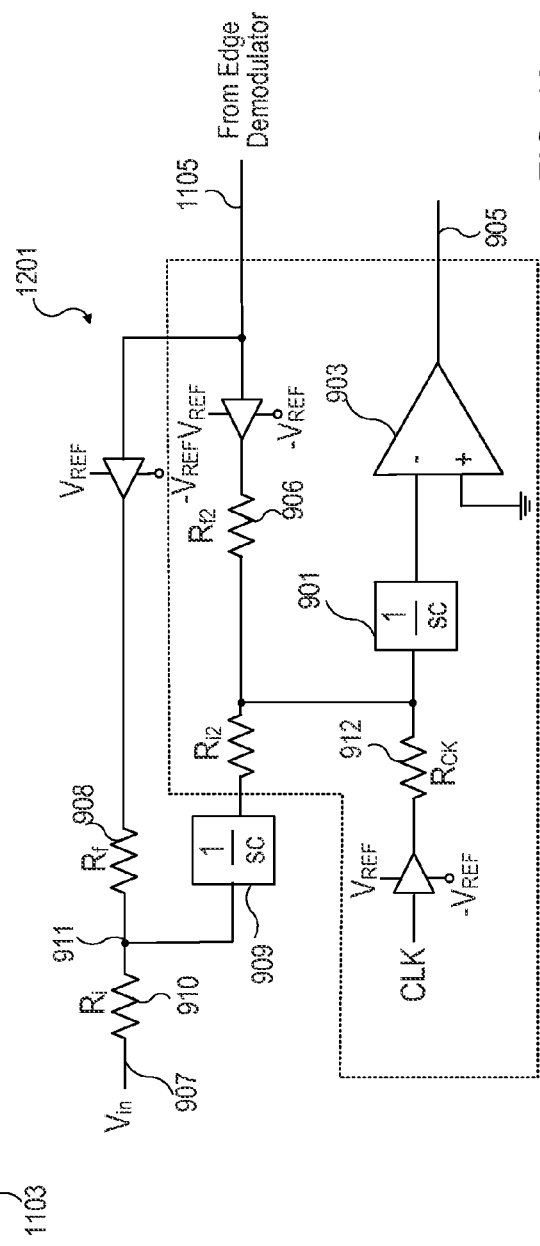
FIG. 12 illustrates an embodiment in which a second order PWM utilizes a feedback signal from an edge demodulator to address impairments in the edge modulator.

Referring back to FIG. 2, the edge modulator 203 can introduce its own offset (and because of self-created disturbances on its supply), even distortion. FIGS. 11 and 12 illustrate embodiments in which the offset and distortion of the edge modulator 203 is addressed by providing a simple edge demodulator 1101 that receives the signal 1103 from the edge modulator. The edge demodulator signal 1105, which matches the input signal but now contains the impairments introduced by the edge modulator, is fed back to the PWM 1102 instead of using the output of the comparator directly in the PWM as shown in FIGS. 8 and 9. With the impairments (offset and possible distortion) within the feedback loop, the PWM now cancels them. FIG. 12 illustrates an embodiment in which PWM 1102 is implemented as second order PWM 1201 configured utilize the edge demodulator signal 1105 as the feedback signal. Note that while feeding back the edge demodulator signal 1105 to a second order PWM circuit is illustrated in FIG. 12, the pulse width modulator 1102 of FIG. 11 can also be implemented as the first order circuit of FIG. 8 modified to utilize signal 1105 as the feedback signal rather than the output of the comparator 801.

Thus, various approaches have been described relating to transport of an analog signal across an isolation barrier. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method comprising:
 receiving an input signal to modulate and a modulation signal to modulate the input signal;
 generating a pulse width modulated (PWM) signal using the input signal and the modulation signal in a pulse width modulator circuit;
 converting a rising edge of the pulse width modulated signal to a first pulse having a first width;
 converting a falling edge of the pulse width modulated signal to a second pulse having a second width;
 transmitting the first and second pulses across a communication channel;
 supplying the first and second pulses to an edge demodulator and generating an edge demodulated signal; and
 supplying the edge demodulated signal as a feedback signal to the pulse width modulator circuit.

2. The method as recited in claim 1 wherein the first pulse and the second pulse have the same polarity.

3. The method as recited in claim 1 further comprising:
 generating the PWM signal using a second order pulse width modulator as the pulse width modulator circuit.

4. The method as recited in claim 3 wherein generating the PWM signal further comprises:
 combining at a first node a first signal corresponding to the pulse width modulated signal and a second signal corresponding to the input signal, to generate a first combined signal, and supplying the first combined signal to a first integrator;
 integrating the first combined signal in the first integrator and supplying a first integrated signal from the first integrator;
 combining a third signal corresponding to a clock signal, a fourth signal corresponding to the first integrated signal and a fifth signal corresponding to the PWM signal to generate a second combined signal;
 integrating the second combined signal in a second integrator and generating a second integrated signal;
 supplying the second integrated signal to a comparator; and
 supplying the PWM signal from the comparator.

5. The method as recited in claim 1 wherein the communication channel is an isolation channel.

6. The method as recited in claim 1 further comprising:
 receiving a signal including the first and second pulses at a receiver coupled to the communication channel; and
 edge demodulating the first and second pulses to recreate the pulse width modulated signal.

7. The method as recited in claim 6 further comprising:
 demodulating the recreated pulse width modulated signal and supplying an output signal corresponding to the input signal.

8. The method as recited in claim 6 further comprising:
 determining whether a particular pulse corresponds to a rising edge or a falling edge of the pulse width modulated signal according to whether the particular pulse has the first width or the second width.

9. The method as recited in claim 8 further comprising setting a flip-flop if the particular pulse has the first width and resetting the flip-flop if the particular pulse has the second width.

10. The method as recited in claim 1 further comprising sensing a current and wherein the input signal is a voltage corresponding to the sensed current.

11. The method as recited in claim 1 further comprising receiving the input signal from a low noise amplifier.

12. An apparatus comprising:
 a second order pulse width modulation circuit coupled to receive an input signal to modulate and a modulation signal to modulate the input signal and coupled to supply a pulse width modulated (PWM) signal, wherein the second order pulse width modulation circuit includes,
 a first integrator coupled to a first combined signal that is a combination of a first signal corresponding to the PWM signal and a second signal corresponding to the input signal, the first integrator configured to integrate the first combined signal and supply a first integrated signal corresponding to an error between the pulse width modulated signal and the input signal;
 a second integrator coupled to a second combined signal that is a combination of a third signal corresponding to the modulation signal, a fourth signal corresponding to the first integrated signal, and a fifth signal corresponding to the PWM signal, the second integrator configured to integrate the second combined signal and supply a second integrated signal; and
 a comparator having a negative input coupled to receive the second integrated signal and a positive input coupled to ground, the comparator configured to supply the pulse width modulated signal;
 an edge modulation circuit coupled to receive the PWM signal and supply an edge modulated PWM signal;
 the edge modulation circuit responsive to receipt of a rising edge of the pulse width modulated signal to generate a first pulse having a first pulse width and responsive to receipt of a falling edge of the pulse width modulated signal to generate a second pulse having a second pulse width and having the same polarity as the first pulse, thereby generating the edge modulated PWM signal; and
 a transmitter coupled to the edge modulation circuit to transmit the edge modulated PWM signal including the first and second pulses across a communication channel.

13. An apparatus comprising:
 a pulse width modulation circuit coupled to receive an input signal to modulate and a modulation signal to modulate the input signal and coupled to supply a pulse width modulated (PWM) signal;
 an edge modulation circuit coupled to receive the PWM signal and supply an edge modulated PWM signal;
 the edge modulation circuit responsive to receipt of a rising edge of the PWM signal to generate a first pulse having a first pulse width and responsive to receipt of a falling edge of the PWM signal to generate a second pulse having a second pulse width and having the same polarity as the first pulse, thereby generating the edge modulated PWM signal;

a transmitter coupled to the edge modulation circuit to transmit the edge modulated PWM signal including the first and second pulses across a communication channel;

an edge demodulator circuit coupled to the edge modulation circuit and configured to supply an edge demodulated signal; and wherein the edge demodulated signal is utilized by the pulse width modulation circuit as a feedback signal.

14. The apparatus as recited in claim 12 wherein the communication channel is a capacitive isolation channel.

15. The apparatus as recited in claim 12 further comprising:

an edge demodulating circuit coupled to receive the edge modulated PWM signal and to recreate the PWM signal based on the first and second pulses.

16. The apparatus as recited in claim 15 further comprising:

a PWM demodulator circuit to demodulate the recreated PWM signal and supply an output signal corresponding to the input signal.

17. The apparatus as recited in claim 15 wherein the edge demodulating circuit is configured to determine whether a particular pulse corresponds to a rising edge or a falling edge of the pulse width modulated signal according to whether the particular pulse has the first pulse width or the second pulse width.

18. The apparatus as recited in claim 17 wherein the edge demodulating circuit comprises a flip-flop and the edge demodulating circuit is configured to set the flip-flop responsive to the particular pulse having the first pulse width and configured to reset the flip-flop if the particular pulse has the second pulse width.

19. The apparatus as recited in claim 12 further comprising a low noise amplifier coupled to supply the input signal.

20. An apparatus comprising:

an edge modulation circuit coupled to receive a pulse width modulated signal and responsive to receipt of rising edges of the pulse width modulated signal to generate respective first pulses having a first pulse width and responsive to receipt of falling edges of the pulse width modulated signal to generate respective second pulses having a second pulse width, the edge modulation circuit thereby generating an edge modulated signal with the first and second pulses;

a capacitive isolation channel is coupled to receive the edge modulated signal; and an edge demodulating circuit coupled to the capacitive isolation channel to receive the edge modulated signal and to recreate the pulse width modulated signal based on the first and second pulses;

wherein the edge demodulating circuit is configured to determine whether a particular pulse corresponds to a rising edge or a falling edge of the pulse width modulated signal according to whether the particular pulse has the first pulse width or the second pulse width; and wherein the edge demodulating circuit comprises a flip-flop and the edge demodulating circuit is configured to set the flip-flop responsive to the particular pulse having the first pulse width and configured to reset the flip-flop if the particular pulse has the second pulse width.

* * * * *